United States Patent [19]

Rollinger

[11] 4,054,201
[45] Oct. 18, 1977

[54] LUGGAGE SORTATION DEVICE
[75] Inventor: Gary J. Rollinger, Belgium, Wis.
[73] Assignee: Rexnord, Inc., Milwaukee, Wis.
[21] Appl. No.: 611,756
[22] Filed: Sept. 9, 1975
[51] Int. Cl.$^2$ ............................................. B65G 47/26
[52] U.S. Cl. .................................... 198/455; 198/601
[58] Field of Search ................. 198/30, 32, 29, 20 R, 198/357, 454, 455, 601, 611

[56] References Cited
U.S. PATENT DOCUMENTS

| | | | |
|---|---|---|---|
| 2,541,300 | 2/1951 | Silva | 198/30 |
| 2,560,995 | 7/1951 | Stiles | 198/32 |
| 2,877,883 | 3/1959 | Lanham | 198/32 |
| 3,162,291 | 12/1964 | Bell | 198/32 X |
| 3,780,849 | 12/1973 | Hoehl et al. | 198/30 |
| 3,838,763 | 10/1974 | Rooke et al. | 198/20 R |

Primary Examiner—John J. Love
Assistant Examiner—Richard K. Thomson
Attorney, Agent, or Firm—Sughrue, Rothwell, Mion, Zinn and Macpeak

[57] ABSTRACT

A luggage merging device comprising a luggage carrying conveyor belt, two luggage guiding conveyor belts disposed generally perpendicularly to the luggage carrying conveyor belt and defining a converging path for the luggage, and a buck roller. One of the luggage guiding conveyor belts is powered at least generally in the direction of the luggage carrying conveyor belt, the other is powered at least generally in the opposite direction, and the buck roller is located at the upstream end of the latter.

2 Claims, 3 Drawing Figures

LUGGAGE SORTATION DEVICE

FIELD OF THE INVENTION

This invention relates to luggage conveying systems such as are used, for example, at airports. It is particularly adapted to facilitate the merger of two converging streams of luggage into a single-file stream.

SUMMARY OF THE INVENTION

My invention is an improvement on the invention claimed in commonly assigned U.S. application Ser. No. 611,770, filed Sept. 9, 1975 now abandoned. The invention claimed therein is a luggage sortation device comprising a luggage carrying conveyor belt and two luggage guiding means disposed generally perpendicularly to the luggage carrying conveyor belt and defining a converging path for the luggage. One of the luggage guiding means may be a conveyor belt which is powered at least generally in the direction of the luggage carrying conveyor belt, and the other luggage guiding means is a conveyor belt which is powered at least generally in the opposite direction. My improvement on that basic device comprises a buck roller mounted at the upstream end of the oppositely directed guiding conveyor belt and disposed so that its peripheral surface extends beyond the working surface of that conveyor belt and into the path of the luggage, thereby forcing luggage out away from the guiding conveyor belt.

DESCRIPTION OF THE PREFERRED EMBODIMENT

Figure 1:
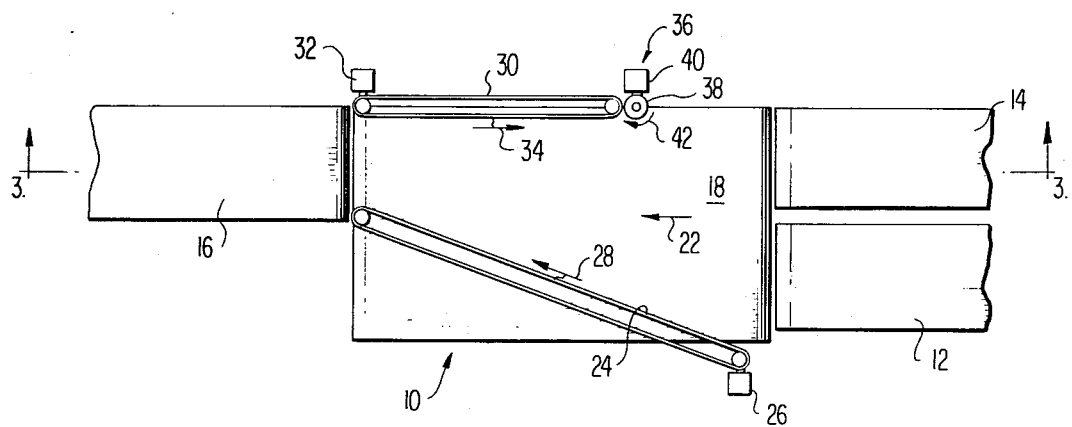
FIG. 1 is a plan view of my presently preferred embodiment and certain ancillary apparatus.
Figure 2:
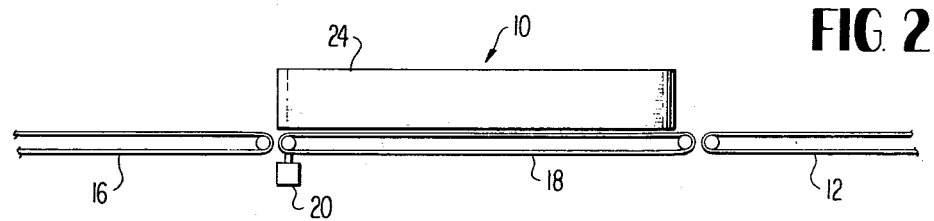
FIG. 2 is a side view of embodiment shown in FIG. 1.
Figure 3:
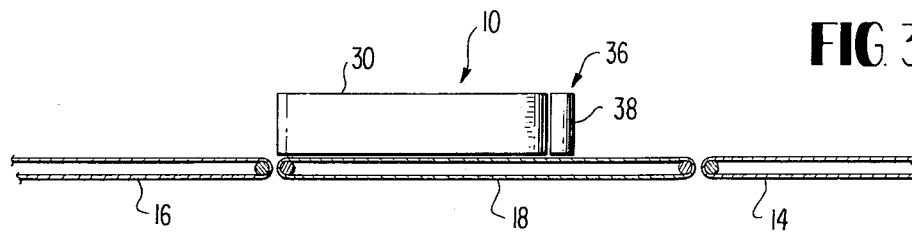
FIG. 3 is a section view along the line 3—3 in FIG. 1.

The drawings show the luggage merging device 10 in association with two parallel incoming conveyor belts 12 and 14 and a single outgoing conveyor belt 16. The incoming conveyor belts 12 and 14 may, for example, be the outgoing conveyor belts from a system such as is disclosed in commonly assigned U.S. Pat. No. 3,863,781, issued to Butzow et al., but my invention is of course not limited to use with that system.

The preferred embodiment of the luggage merger device 10 comprises a first conveyor belt 18 adapted to carry luggage, first means 20 for driving the working surface of the conveyor belt 18 in the direction by the arrow 22, a second conveyor belt 24 mounted adjacent to the conveyor belt 18 such that the working surface thereof is generally perpendicular to the working surface of the conveyor belt 18, second means 26 for driving the working surface of the conveyor belt 24 in the direction indicated by the arrow 28, a third conveyor belt 30 mounted adjacent to the conveyor belt 18 such that the working surface thereof is generally perpendicular to the working surface of the conveyor belt 18, and third means 32 for driving the working surface of the conveyor belt 30 in the direction indicated by the arrow 34. The working surface of the conveyor belt 24 is disposed at an angle to the direction of motion of luggage on the conveyor belt 18, and the working surface of the conveyor belt 30 is disposed parallel to that direction. The separate means 20, 26, and 32 may, of course, be replaced by one motor and a system of chains, belts, or the like, and the conveyor belt 24 may be replaced by a non-powered deflector plate.

So far, the description has been of Mr. Theijsmeijer's invention, claimed in the above-mentioned copending application. My invention was motivated by the fact that the working surface of the conveyor belt 30 is preferably made of a material, such as knurled rubber, which has a high coefficient of friction with respect to luggage. Making the conveyor belt 30 that way improves the operation of the sortation device, but, in order to avoid scuffing the surfaces of the luggage, contact between the luggage and the high-friction surface moving in the opposite direction should be avoided except where necessary. To avoid such contact except where necessary, I provide a buck roller unit 36, which is preferably powered. In my presently preferred embodiment, the buck roller unit 36 comprises a buck roller 38 mounted adjacent to the conveyor belt 18 and the upstream end of the conveyor belt 30 and means 40 for driving the buck roller 38 about its axis of rotation in the direction shown by the arrow 42. The peripheral surface of the buck roller 38 extends beyond the working surface of the conveyor belt 30 into the converging path for luggage carried by the conveyor belt 18, thereby forcing luggage which approaches the luggage merging device 10 on the conveyor belt 14 out into the converging path and away from the high-friction surface of the conveyor belt 30.

In operation of the overall luggage merging device, when a piece of luggage from the conveyor belt 12 and another piece of luggage from the conveyor belt 14 arrive at the luggage merging device 10 simultaneously, they are forced together and towards the conveyor belt 30 by the surface of the conveyor belt 24. When the piece of luggage from the conveyor belt 14 comes into contact with the working surface of the conveyor belt 30, it is forced backward relative to the piece of luggage from the conveyor belt 12, causing the two pieces of luggage to exit from the sortation device 10 in single file with the piece of luggage from the conveyor belt 12 in the lead. Similarly, if a piece of luggage enters the narrow part of the converging path broadside and that dimension is too large to fit between the downstreams ends of the conveyor belts 24 and 30, the action of the conveyor belt 30 will cause the piece of luggage to pivot, presenting a narrower dimension to the exit.

When the merging device 10 is used to convert two or more incoming streams of luggage into a single stream, it is desirable to run the conveyor belts 18 and 16 at a speed well in excess of of that of the incoming lines — in fact, at a speed at least equal to the sum of the speeds of the incoming lines where they are all heavily trafficked. (Of course, this precaution is not necessary if the incoming lines are not heavily trafficked). The conveyor belt 24 is preferable run at a speed such that the component of its velocity parallel to the velocity of the conveyor belt 18 is the same or slightly greater than the velocity of the conveyor belt 18, and the buck roller 38 is preferably rotated at an angular velocity such that its peripheral speed is the same or slightly greater than the speed of the conveyor belt 18. This is because the conveyor belt 24 and the buck roller 38 are used basically to cause lateral shifting of luggage carried by the conveyor belt 18. As for the conveyor belt 30, its speed is a function of the speed of the conveyor belt 18 and the coefficient of friction of the working surface of the conveyor belt 30 with respect to luggage. In practice, when the working surface of the conveyor belt 30 is made of knurled rubber, speeds of 200 feet/minute for the conveyor belt 18 and 100 feet/minute for the conveyor belt 30 have been found satisfactory.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. In a luggage merging device for handling randomly sized, shaped, and weighted luggage comprising:
   a. a first conveyor belt adapted to carry luggage;
   b. first means for driving the working surface of said first conveyor belt in a first direction;
   c. a luggage guiding means mounted adjacent to said first conveyor belt such that the working surface thereof is generally perpendicular to the working surface of said first conveyor belt and is disposed at an angle to the first direction;
   d. a second conveyor belt having a high coefficient of friction mounted adjacent to said first conveyor belt such that the working surface thereof is generally perpendicular to the working surface of said first conveyor belt and is disposed parallel to the first direction; and
   e. second means for driving the working surface of said second conveyor belt in the direction opposite to the first direction the improvement comprising a buck roller mounted adjacent to said first conveyor belt and the upstream end of said second conveyor belt, said buck roller being mounted for rotation about an axis at least generally perpendicular to the working surface of said first coneyor belt, being disposed so that the peripheral surface thereof extends beyond the working surface of said second conveyor belt into the converging path for luggage carried by said first conveyor belt, and being driven about its axis of rotation in the direction such that the peripheral surface which extends in to the converging path moves in the direction of said working surface of said first conveyor belt, whereby said luggage which approaches the luggage merging device is laterally shifted away from said second conveyor by said buck roller and is prevented from scuffing against said second conveyor.

2. The apparatus according to claim 1 wherein said buck roller is rotated at an angular velocity which will produce a peripheral speed approximately equal to the speed of said first conveyor belt.

* * * * *